Jan. 2, 1951   J. J. GOETT   2,536,602
AUTOMATIC FLANGE SYSTEM
Filed July 6, 1944   2 Sheets-Sheet 1
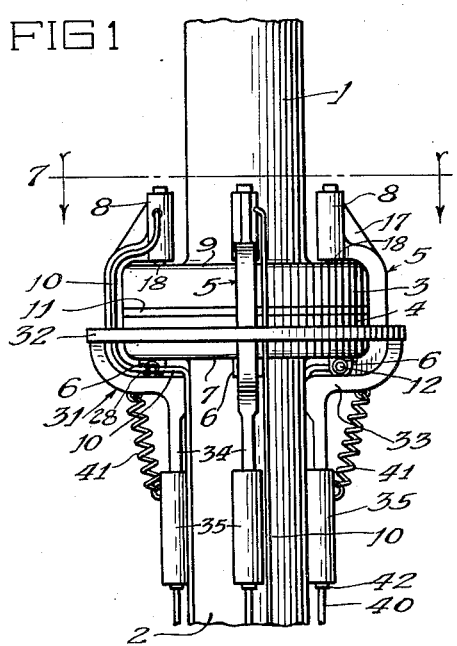
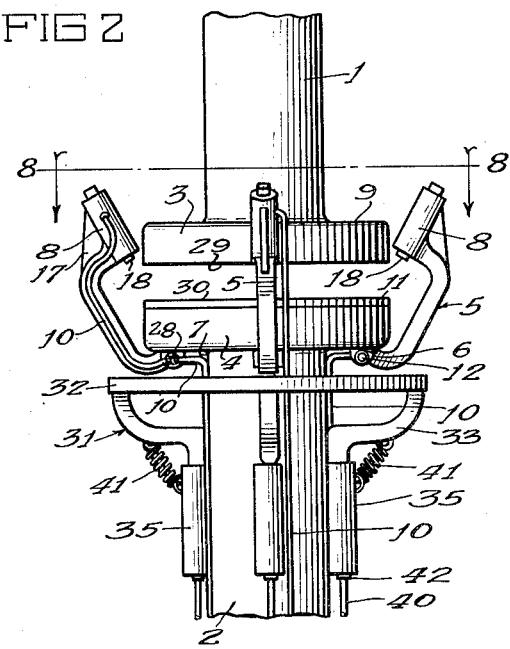
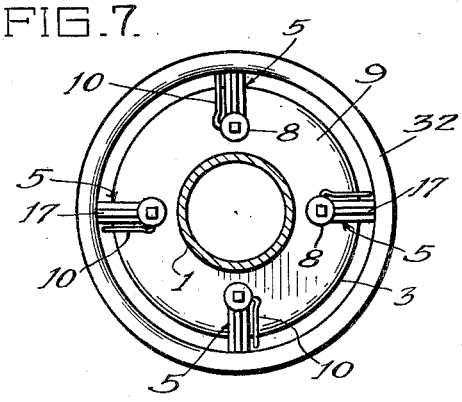
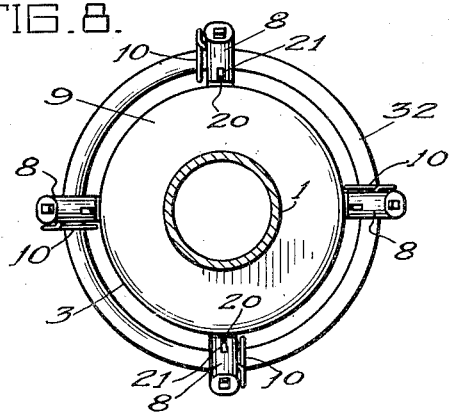
Inventor:
John J. Goett
By: Robert A. Leverett
Attorney

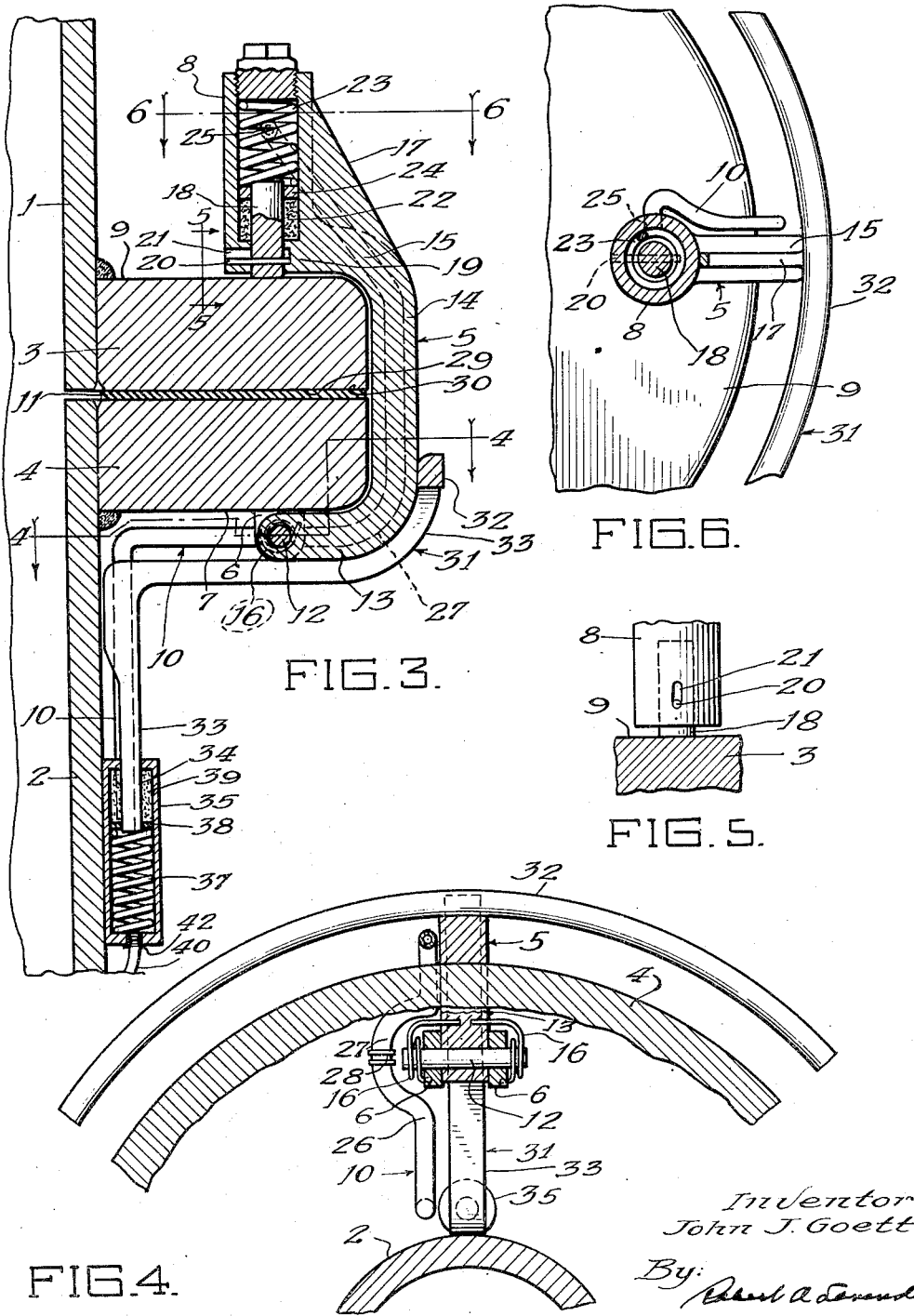

Patented Jan. 2, 1951

2,536,602

UNITED STATES PATENT OFFICE 2,536,602

AUTOMATIC FLANGE SYSTEM

John J. Goett, Chicago, Ill., assignor to the United States of America as represented by the United States Atomic Energy Commission Application July 6, 1944, Serial No. 543,698

9 Claims. (Cl. 285—129)

This invention relates to a device for opening, closing and sealing sections of a pipe line by remote control.

Joints between sections in a pipe line are often located in positions that are difficult, inconvenient or dangerous to reach by ordinary means. It is advantageous to be able to couple and uncouple such joints from a conveniently removed location by means of remote control.

It is therefore an object of this invention to provide a device for safely opening, closing and sealing pipe joints and junctions that are physically inaccessible or are so situated as to endanger the health or life of a person attempting to reach them.

More specifically, it is an object of the invention to provide a device for opening, closing and sealing pipe joints and junctions by remote control.

Further and other objects and advantages of the present invention will become apparent from the following description and the drawings, in which:

Fig. 1 is an elevational view of a junction of pipe sections sealed by the external clamps forming the subject matter of the present invention;

Fig. 2 is an elevational view of the pipe junction shown in Fig. 1 with the clamps in open position and the pipe sections separated;

Fig. 3 is an enlarged longitudinal sectional view through one of the clamps and a portion of the junction between the pipe sections;

Fig. 4 is a transverse sectional view of the hinged joint between the clamp and the lower flange, the view being taken on the line 4—4 of Fig. 3;

Fig. 5 is an elevational view of the contact member forming part of the clamp and engaging the upper pipe flange, the view being taken on the line 5—5 of Fig. 3;

Fig. 6 is a transverse sectional view through part of the clamp and taken on the line 6—6 of Fig. 3;

Fig. 7 is a transverse sectional view through one of the pipe sections and showing in plan view the clamp illustrated in Fig. 1, the view being taken on the line 7—7 of Fig. 1; and Fig. 8 is a transverse sectional view corresponding to Fig. 7 but showing the clamps in open position, the view being taken on the line 8—8 of Fig. 2.

Fastening means heretofore employed for joining sections of pipe are not satisfactory for many purposes because the operation of tightening the joint must take place at a location that can be reached by an operator. Sections of a pipe joint generally are tightened by bolting together flanges on each of the sections with nuts and bolts or by a friction grip obtained by drawing a bail or similar link fastened on one section over a lug on the other section. Where the junction is located at the point that cannot be easily or safely reached such fastening mechanisms cannot be used.

My invention avoids the necessity of physically reaching the joint to be tightened, with tools or by hand, by providing a flange closing system wherein the tightening means is actuated and remotely controlled by a hydraulic or fluid pressure system. In general terms, the flange closing system of my invention comprises a flange provided with hydraulic clamps fastened to one of the pipe sections and capable of clasping a flange on another pipe section when actuated from a remote location.

When a junction in a sectional pipe line is desired at a point that is inaccessible, inconvenient, or dangerous, the seal against the leakage of the contents of the pipe line between the sections may be accomplished by remote control using an automatic clamp mechanism, as shown in Fig. 1.

In Fig. 1 the pipe sections 1 and 2 have terminal flanges 3 and 4 that abut to make a junction in the pipe line. This junction is sealed by a plurality of hydraulic clamps 5 which are hinged to lugs 6 on a face 7 of the lower pipe flange 4. Each of the clamps 5 curve around the flange surfaces to embrace the two flanges 3 and 4. A piston 18 (see Fig. 3) is provided in an end chamber 8 at the free end of each clamp 5 for applying a compresssional force on a top free face 9 of the upper flange 3. Hydraulic pressure for actuating the piston 18 in chamber 8 is supplied by pipe line 10 running to the clamp 5 along pipe section 2 from a supply (not shown), a portion of the pipe line 10 being flexible to permit rotation of the clamps, as will later be described.

In the clamping position the pistons 18 (Fig. 3) on clamps 5 are used to force the two pipe flanges 3 and 4 together. An upper surface 30 of a gasket 11 placed on the inner face of the lower flange 4 and an inner face 29 of the flange 3 are abutting faces which are forced together by the action of the pistons 18 to provide a tight seal against leakage. In order to permit the pipe sections 1 and 2 to be readily coupled and uncoupled, the hydraulic clamps 5 are hinged on lugs 6 so that they can swing from the clamping position into flange clearing position, clear of the flange 3 as shown in Fig. 2.

In Fig. 3 is shown in enlarged detail the construction of one of the hydraulic clamps 5 and a part of the junction. The hydraulic clamp 5 has a hinged arm 13, a body 14 and a free arm 15. The arm 13 is hinged to lugs 6 on the pipe flange face 7. Fig. 4 shows a horizontal sectional view of the hinging of clamp 5 to the lugs 6. Shaft 12, thrust through the end of arm 13 and lugs 6 to form a fulcrum member, fastens these members together. Pin springs 16 coiled around each end of the shaft 12 bear against the lugs 6 and arm 13 to provide a spring action for urging the clamp 5 away from the flange 4. The arms 13 and 15 and the body 14 of the clamp 5 fit around the abutting flanges 3 and 4 so that the free arm 15 overhangs the free surface 9 of flange 3 and the hinged arm 13 underlies flange 4. At the end of arm 15 the cylindrical chamber 8 is backed by a stiffening rib 17. The piston 18, actuated by a hydraulic pressure system, projects from the chamber 8 through a wall 19 at the bottom of chamber 8 to bear against the free face 9 of the flange 3. The piston 18 is retained against falling out by a pin 20 that transfixes the piston 18 and slides in a slot 21 in the wall 19 to permit the piston a limited freedom of movement, axial in direction when the clamp is fully moved inwardly to clamping position. Figure 5 shows the pin 20 in the slot 21 with the piston 18 bearing against the free face 9. To maintain a seal against leakage of fluid from the chamber 8, the piston 18 passes through packing 22 seated against the wall 19 at the bottom of chamber 8 by a spring 23 bearing against a follower 24 on the top of the packing 22.

The piston 18, when in clamping position, moves in a path perpendicular to the surface 9 against which it bears and axial with respect to the line of the pipe sections 1 and 2. Hydraulic pressure is supplied to the chamber 8 from a suitable supply, not shown, through pipe line 10, and feeds into the chamber 8 through an aperture 25 in the side as shown in Fig. 6. The pipe line 10 is divided into sections 26 and 27 (Fig. 4) which are joined by a flexible elbow 28 at the hinge between clamp 5 and lug 6. The section 26 extends to the clamp 5 from the supply source and is attached to section 27 through flexible elbow 28. The section 27 makes connection between the elbow 28 and aperture 25 in the wall of chamber 8. The feeding of fluid to the chamber 8 through pipe line 10 is remotely controlled at a point removed from the junction. Pressure is introduced in the pipe line 10 from the supply source and is transmitted through sections 26 and 27 to the chamber 8 where it is applied to piston 18 forcing it out and against the free flange face 9. The action of the piston 18 is to move the upper pipe section 1 in an axial direction toward the lower pipe section 2 which is held relatively stationary. The consequent squeezing action forces the abutting faces 29 and 30 together and provides a tight seal.

Pin springs 16 coiled around pin 12 and bearing against lugs 6 and arm 13 cause the normal position of the clamps 5 to be open or pivoted away from the flange 4 by an amount sufficient to clear flange 4 when the pipe sections 1 and 2 are moved apart. When the clamps 5 are in the position of their arc of travel where they clear flange 3, they may be moved into a clamping position for engagement with flange 3 by a spider ring assembly 31 that encircles the joint and clamps 5 as shown in Figs. 1, 2, 7 and 8. The ring assembly 31 is composed of a ring 32 supported by one end of each of a set of spider arms 33. Ring 32 has an internal opening small enough to engage the clamps when in open position and by sliding over them, to force them inwardly until the pistons 18 are axially positioned over free face 9. The other end of each spider arm 33 opposite the ring 32 terminates in a hydraulically actuated ring piston 34. The ring pistons 34 are moved out of hydraulic chambers 35 by hydraulic pressure and retracted into the chambers 35 by the action of springs 41 thereby moving the ring assembly 31 into and out of engagement with the clamps 5. To raise the spider ring assembly 31, hydraulic pressure is supplied to the chambers 35 through pipe lines 40 from a suitable source of supply. The feeding of the pressure fluid to the chambers 35 is remotely controlled to move the spider ring assembly 31. The pipe lines 40 feed into the chambers 35 through bushings 42 at the bottom of the chambers 35. Seals against leakage of fluid from chambers 35 is provided by packings 39 around the pistons 34 and held by springs 37 bearing against followers 38.

In Figs. 2 and 8 the spider ring assembly 31 is shown lowered and the clamps 5 are in open position. The pipe section 1 is raised away from the pipe section 2 to show the relative position of coupling and uncoupling. When effecting the junction, the pipe section 1 is brought against the gasket 11 on pipe section 2 so that the faces 29 and 30 abut. The joint is then ready for tightening and the spider ring assembly 31, starting in the lowered position shown in Figs. 2 and 8 and moving to the raised position shown in Figs. 1 and 7 gathers the normally cocked open clamps 5 and moves them to embrace flanges 3 and 4, whereupon the pistons 18 may be forced against the flange 3 to provide the requisite amount of compression to seal the joint against leakage of the contents of the pipe line. The pressure in the chambers 8 may then be locked to hold the joint tightened as long as is desired.

To disassemble the junction and disconnect the pipe sections, the process of coupling is reversed. The pressure on the pistons 18 through the pipe lines 10 is released, and the pistons 18 are freed from the flange 3. Pressure on the pistons 34 in the chambers 35 is then released and the springs 41 draw the ring assembly out of engagement with the clamps 5 and permit the pin springs 16 to act upon the clamps 5 forcing them to swing outwardly into the open position shown in Figs. 2 and 8. When the clamps 5 have reassumed the open position shown in Figs. 2 and 8, the pipe sections 1 and 2 may be disconnected by relative axial movement.

The manner, as described, of rotating the clamps to a flange embracing position will suggest various ways by which the closing of the clamps around the flanges may be accomplished. The particular arrangement of clamps shown and described herein has been adopted for convenience. It is realized, of course, that other modifications may be made without departing from the intended scope of the invention.

I claim:

1. In combination, a pair of pipe sections, terminal flanges on said pipe sections having abutting faces and opposite free faces, a plurality of clamps each hinged at one end to one of said flanges and shaped to place the free end of said clamp over the free face of the other of said flanges in one hinged position and to place the free end of said clamp clear of the other of said flanges in another hinged position, a piston in the free end of each of said clamps and moveable with respect to said clamps to force said flanges into abutting relationship, remote control means for operating said pistons, and means operable from a remote location for controlling the movement of said clamps from one hinged position to the other.

2. In combination, a pair of pipe sections, terminal flanges on said pipe sections having abutting faces and opposite free faces, a plurality of clamps each hinged at one end to one of said flanges and shaped to place the free end of said clamp over the free face of the other of said flanges in one hinged position and to place the free end of said clamp clear of the other of said flanges in another hinged position, a piston in the free end of each of said clamps and moveable with respect to said clamps to force said flanges into abutting relationship, a hydraulically actuated means for operating said pistons, and means operable from a remote location for controlling the movement of said clamps from one hinged position to the other.

3. In combination, a pair of pipe sections, terminal flanges on said pipe sections having abutting faces and opposite free faces, a plurality of clamps each hinged at one end to one of said flanges and shaped to place the free end of said clamp over the free face of the other of said flanges in one hinged position and to place the free end of said clamp clear of the other of said flanges in another hinged position, a piston in the free end of each of said clamps and movable by hydraulic pressure with respect to said clamps to force said flanges into abutting relationship, a conduit through which the hydraulic pressure is transmitted to said piston running along the hinged pipe section and flexibly connected to said clamps, and means from a remote location for controlling the movement of said clamps from one hinged position to the other.

4. In combination, a pair of pipe sections, terminal flanges on said pipe sections having abutting faces and opposite free faces, a plurality of clamps each hinged at one end to one of said flanges and shaped to place the free end of said clamp over the free face of the other of said flanges in one hinged position and to place the free end of said clamp clear of the other of said flanges in another hinged position, a piston in the free end of each of said clamps and movable with respect to said clamps to force said flanges into abutting relationship, remote control means for operating said pistons, a ring positioned around the pipe section to which pipe section the clamps are hinged and having an internal diameter such as to engage said clamps when moved axially toward said flanges, and means for axially moving said ring to move said clamps from one of said hinged positions to the other.

5. In combination, a pair of pipe sections, terminal flanges on said pipe sections having abutting faces and opposite free faces, a plurality of clamps each hinged at one end to one of said flanges and shaped to place the free end of said clamp over the free face of the other of said flanges in one hinged position and to place the free end of said clamp clear of the other of said flanges in another hinged position, a piston in the free end of each of said clamps and movable with respect to said clamps to force said flanges into abutting relationship, remote control means for operating said pistons, a ring positioned around the pipe section to which pipe section the clamps are hinged and having an internal diameter such as to engage said clamps when moved axially toward said flanges, spider arms attached at one end to said ring, the other ends of said spider arms terminating adjacent said latter pipe section and actuating means on said latter pipe section supporting the adjacent ends of said spider arms whereby said ring is moved axially to move said clamps from one of said hinged positions to the other.

6. In combination, a pair of pipe sections, terminal flanges on said pipe sections having abutting faces and opposite free faces, a plurality of clamps each hinged at one end to one of said flanges and shaped to place the free end of said clamp over the free face of the other of said flanges in one hinged position and to place the free end of said clamp clear of the other of said flanges in another hinged position, a piston in the free end of each of said clamps and movable with respect to said clamps to force said flanges into abutting relationship, remote control means for operating said pistons, a ring positioned around the pipe section to which pipe section the clamps are hinged and having an internal diameter such as to engage said clamps when moved axially toward said flanges, spider arms attached at one end to said ring and hydraulic actuating means on said pipe section including hydraulic cylinders surrounding the other ends of said spider arms whereby said ring is moved axially by hydraulic pressure exerted on the ends of said spider arms in said hydraulic cylinders, to move said clamps from one of said hinged positions to the other.

7. For use in joining two pipe sections having terminal flanges adapted to abut against each other, a clamping device comprising a movable clamp member, a fulcrum member, means pivotally mounting the movable clamp member on said fulcrum member, the fulcrum member being fixed relative to one of said pipe sections, the clamp member being movable about said fulcrum member from an open position to a clamping position, resilient means normally holding the clamp member in open position, remote control means for moving the clamp member from open position to clamping position including a piston operating by hydraulic pressure, movable means on the clamp member adapted to engage the flange on one of the pipe sections, and remote control means including a hydraulically operated cylinder operating said movable means.

8. For use in joining two pipe sections having terminal flanges adapted to abut against each other, a clamping device comprising a movable clamp member, a fulcrum member, means pivotally mounting the movable clamp member on said fulcrum member, the fulcrum member being fixed relative to one of said pipe sections, the clamp member being movable about said fulcrum member from an open position to a clamping position, resilient means normally holding the clamp member in open position, and remote control means for moving the clamp member from open position to clamping position including a piston operating by hydraulic pressure and operatively connected to the clamp member.

9. In combination a pair of pipe sections having terminal flanges having abutting faces and opposite free faces, a clamp, said clamp having an open position and a clamping position and comprising means engaging one of said pipe sections, a second means adapted to engage the other of said pipe sections, resilient means normally holding the clamp in open position, and fluid pressure means forcing the clamp into clamping position, thereby to force both of said engaging means toward each other.

JOHN J. GOETT.

REFERENCES CITED

The following references are of record in the file of this patent:

UNITED STATES PATENTS

| Number | Name | Date |
|---|---|---|
| 1,530,651 | Corbett | Mar. 24, 1925 |
| 1,910,706 | Malzard | May 23, 1933 |

FOREIGN PATENTS

| Number | Country | Date |
|---|---|---|
| 301,066 | Great Britain | Oct. 3, 1929 |
| 469,725 | Great Britain | July 30, 1937 |